(12) United States Patent
Kuramashi et al.

(10) Patent No.: US 10,280,825 B2
(45) Date of Patent: May 7, 2019

(54) EXHAUST STRUCTURE FOR MULTI-CYLINDER ENGINE

(71) Applicant: MAZDA MOTOR CORPORATION, Hiroshima (JP)

(72) Inventors: Taku Kuramashi, Hatsukaichi (JP); Ryota Joya, Hiroshima (JP); Tomonori Nishida, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 59 days.

(21) Appl. No.: 15/428,170

(22) Filed: Feb. 9, 2017

(65) Prior Publication Data

US 2017/0260891 A1 Sep. 14, 2017

(30) Foreign Application Priority Data

Mar. 11, 2016 (JP) .................................. 2016-047854

(51) Int. Cl.
*F01N 13/10* (2010.01)
*F01N 3/24* (2006.01)
(Continued)

(52) U.S. Cl.
CPC ............. *F01N 13/10* (2013.01); *F01N 3/101* (2013.01); *F01N 3/24* (2013.01); *F01N 13/08* (2013.01);
(Continued)

(58) Field of Classification Search
CPC .................................................. F01N 2430/02
See application file for complete search history.

(56) References Cited

U.S. PATENT DOCUMENTS 4,420,933 A * 12/1983 Kajitani .................... F01N 3/28
  60/299
5,410,877 A * 5/1995 Shimada ............... F01N 3/2853
  181/207
(Continued)

FOREIGN PATENT DOCUMENTS

JP 2007-285150 A 11/2007
JP 2008-075561 A 4/2008
(Continued)

*Primary Examiner* — Patrick D Maines
(74) *Attorney, Agent, or Firm* — Studebaker & Brackett PC (57) ABSTRACT

A multi-cylinder engine exhaust structure disclosed herein includes: four branched exhaust pipes respectively communicating with four cylinders classified into two groups, each being comprised of two of the four cylinders with discontinuous exhaust strokes; two intermediate collecting pipes, each being formed by combining associated two of the four branched exhaust pipes respectively communicating with the two cylinders in an associated one of the two groups; a last collecting pipe formed by combining these intermediate collecting pipes; and an exhaust gas purifier coupled to an exhaust gas downstream end of the last collecting pipe. Two of the four branched exhaust pipes respectively communicating with two of the four cylinders to be activated as two active cylinders while the engine is performing a cylinder-cutoff operation are shorter than the two other branched exhaust pipes respectively communicating with the two other cylinders to be deactivated as two idle cylinders during the cylinder-cutoff operation.

7 Claims, 7 Drawing Sheets (51) Int. Cl.
*F01N 3/10* (2006.01)
*F01N 13/08* (2010.01)
*F02B 75/20* (2006.01)
*F02B 75/18* (2006.01)

(52) U.S. Cl.
CPC ........ *F01N 13/107* (2013.01); *F01N 2430/02* (2013.01); *F02B 75/20* (2013.01); *F02B 2075/1816* (2013.01); *Y02A 50/2324* (2018.01); *Y02T 10/22* (2013.01)

(56) References Cited

U.S. PATENT DOCUMENTS

| | | | | |
|---|---|---|---|---|
| 5,787,709 | A * | 8/1998 | Watanabe | F01N 13/10 60/313 |
| 5,816,044 | A * | 10/1998 | Biggs | F01N 13/08 60/313 |
| 6,009,706 | A * | 1/2000 | Haneda | F01N 13/10 60/272 |
| 6,082,103 | A * | 7/2000 | Sugiura | F01N 13/008 60/272 |
| 6,745,561 | B2 * | 6/2004 | Kim | F01N 3/28 60/323 |
| 6,931,839 | B2 * | 8/2005 | Foster | F01N 3/023 123/481 |
| 7,367,180 | B2 * | 5/2008 | Surnilla | F02D 41/0082 60/285 |
| 2002/0166720 | A1 * | 11/2002 | Kusabiraki | F01N 13/08 181/240 |
| 2004/0020195 | A1 * | 2/2004 | Ashida | F01N 13/1805 60/302 |
| 2007/0137189 | A1 * | 6/2007 | Kikuchi | F01N 13/08 60/313 |
| 2008/0072869 | A1 | 3/2008 | Maehara et al. | |
| 2011/0126521 | A1 | 6/2011 | Ushijima et al. | |
| 2011/0126522 | A1 | 6/2011 | Ushijima et al. | |
| 2012/0192552 | A1 | 8/2012 | Okami | |
| 2013/0067897 | A1 * | 3/2013 | Kim | F01N 13/10 60/323 |
| 2015/0053174 | A1 | 2/2015 | Nishimoto et al. | |
| 2015/0053175 | A1 | 2/2015 | Nishimoto et al. | |

FOREIGN PATENT DOCUMENTS

| | | |
|---|---|---|
| JP | 2011-116203 A | 6/2011 |
| JP | 2011-116204 A | 6/2011 |
| JP | 2011-185120 A | 9/2011 |

* cited by examiner

EXHAUST STRUCTURE FOR MULTI-CYLINDER ENGINE

CROSS-REFERENCE TO RELATED APPLICATION

This application claims priority to Japanese Patent Application No. 2016-047854 filed on Mar. 11, 2016, the entire disclosure of which is hereby incorporated by reference.

BACKGROUND

The present disclosure relates to an exhaust structure for a multi-cylinder engine.

An exhaust structure for a multi-cylinder engine, including four branched exhaust pipes, two intermediate collecting pipes, a last collecting pipe, and an exhaust gas purifier, has been known in the art (see, for example, Japanese Unexamined Patent Publication No. 2011-116203). In this exhaust structure, the four branched exhaust pipes respectively communicate with four cylinders of a multi-cylinder engine. Those four cylinders are classified into two groups of cylinders, each comprised of two cylinders with mutually discontinuous exhaust strokes. Each of the two intermediate collecting pipes combines together two branched exhaust pipes respectively communicating with the two cylinders in an associated one of the two groups. The last collecting pipe collects together those two intermediate collecting pipes. The exhaust gas purifier is connected to an exhaust gas downstream end of the last collecting pipe.

SUMMARY

In such an exhaust structure including intermediate collecting pipes between the branched exhaust pipes and the last collecting pipe as the conventional one disclosed in Japanese Unexamined Patent Publication No. 2011-116203, the exhaust gas needs to go a longer distance from the engine to the exhaust gas purifier than in a structure with no intermediate collecting pipes in which the four branched exhaust pipes are all combined together to form the last collecting pipe. Thus, in a structure of the former type, the temperature of the exhaust gas reaching the exhaust gas purifier tends to fall due to dissipation of heat from the surface of the branched exhaust pipes, intermediate collecting pipes, and last collecting pipe.

Some engines may switch their mode of operation from an all-cylinder operation in which all of the four cylinders are activated to a cylinder-cutoff operation in which the two cylinders in one of the two groups of cylinders are deactivated (i.e., only the two cylinders in the other group are activated). If the given engine is of this type, the heat of the exhaust gas released from active cylinders, i.e., the activated ones of the cylinders, needs to be conducted efficiently to the exhaust gas purifier while the engine is performing the cylinder-cutoff operation. Otherwise, it would be difficult to raise the temperature of the exhaust gas purifier to a catalyst activation temperature quickly while the engine is still cold. In addition, even after the temperature of the exhaust gas purifier has reached the catalyst activation temperature, the former temperature could fall to less than the latter as the cylinder-cutoff operation is continued.

It is therefore an object of the present disclosure to allow such an exhaust structure for a multi-cylinder engine, including the intermediate collecting pipes between the branched exhaust pipes and the last collecting pipe, to conduct the heat of the exhaust gas released from activated cylinders to the exhaust gas purifier efficiently while the engine is performing the cylinder-cutoff operation.

To achieve this object, the present disclosure provides the following exhaust structure for a multi-cylinder engine.

This exhaust structure for a multi-cylinder engine includes: four branched exhaust pipes respectively communicating with four cylinders of the engine, the four cylinders being classified into two groups of cylinders, each group being comprised of two of the four cylinders that have two discontinuous exhaust strokes; two intermediate collecting pipes, each being formed by combining together associated two of the four branched exhaust pipes respectively communicating with the two cylinders in an associated one of the two groups; a last collecting pipe formed by combining together these two intermediate collecting pipes; and an exhaust gas purifier coupled to an exhaust gas downstream end of the last collecting pipe. The engine is able to switch its mode of operation from an all-cylinder operation in which all of the four cylinders are activated to a cylinder-cutoff operation in which the two cylinders in one of the two groups of cylinders are deactivated to serve as two idle cylinders and the two cylinders in the other group of cylinders are activated to serve as two active cylinders, or vice versa. Two of the four branched exhaust pipes respectively communicating with the two active cylinders are shorter in length than the two other branched exhaust pipes respectively communicating with the two idle cylinders.

In this configuration, the two branched exhaust pipes respectively communicating with the two active cylinders are shorter in length than the two branched exhaust pipes respectively communicating with the two idle cylinders, thus allowing the heat of the exhaust gas released from the two active cylinders to be conducted efficiently to the exhaust gas purifier while the engine is performing the cylinder-cutoff operation. Specifically, in this configuration, each of the two branched exhaust pipes respectively communicating with the two active cylinders allows only an amount of exhaust gas for a single active cylinder to flow therethrough. Thus, compared to each of the intermediate collecting pipes allowing an amount of exhaust gas for two active cylinders to flow therethrough, the branched exhaust pipe allows the exhaust gas to flow therethrough at longer time intervals and get cooled more easily, thus causing an increase in the quantity of heat dissipated from the surface of the branched exhaust pipe. Thus, shortening the length of the two branched exhaust pipes respectively communicating with the two active cylinders minimizes the quantity of heat dissipated from the surface of the two branched exhaust pipes. This allows the heat of the exhaust gas released from the active cylinders to be conducted efficiently to the exhaust gas purifier. Consequently, the temperature of the exhaust gas purifier may be raised to a catalyst activation temperature quickly while the engine is performing the cylinder-cutoff operation and still cold. In addition, even after the temperature of the exhaust gas purifier has reached and exceeded the catalyst activation temperature, the former temperature may be kept equal to or higher than the catalyst activation temperature.

In one embodiment of the exhaust structure, the engine is an in-line four-cylinder engine, of which the four cylinders are arranged in line. If the four cylinders are sequentially called first, second, third, and fourth cylinders, respectively, from one end of the line toward the other end of the line, then the first and fourth cylinders serve as the idle cylinders and the second and third cylinders serve as the active cylinders.

This configuration allows the second and third cylinders located at intermediate positions in the cylinder arrangement direction to maintain a higher in-cylinder temperature than the first and fourth cylinders located at both ends in the cylinder arrangement direction. Thus, the heat of the higher-temperature exhaust gas released from the two active cylinders may be conducted efficiently to the exhaust gas purifier while the engine is performing the cylinder-cutoff operation. In addition, the branched exhaust pipes respectively communicating with the second and third cylinders that are adjacent to each other in the cylinder arrangement direction may also be combined together with their length minimized.

In another embodiment of the exhaust structure, the two branched exhaust pipes respectively communicating with the two idle cylinders may be arranged to pass through a space under the two branched exhaust pipes respectively communicating with the two active cylinders, and the exhaust gas purifier may be located under the two branched exhaust pipes respectively communicating with the two idle cylinders.

This configuration allows the temperature of the two branched exhaust pipes, respectively communicating with the two idle cylinders that tend to cool in the deactivated state while the engine is performing the cylinder-cutoff operation, to be maintained by the heat of reaction of the catalyst in the exhaust gas purifier and the heat dissipated from the two branched exhaust pipes respectively communicating with the two active cylinders. Consequently, even after the mode has just been switched from the cylinder-cutoff operation to the all-cylinder operation, the heat of the exhaust gas released from the two idle cylinders that have been deactivated and just activated may also be conducted efficiently to the exhaust gas purifier.

In this particular embodiment, the two branched exhaust pipes respectively communicating with the two idle cylinders and the intermediate collecting pipe formed by combining together the two branched exhaust pipes respectively communicating with the two idle cylinders are arranged to be proximate to a range of the exhaust gas purifier from an upper portion of the purifier through another portion of purifier opposite from the engine.

This configuration allows the two branched exhaust pipes respectively communicating with the two idle cylinders and the intermediate collecting pipe formed by combining together the two branched exhaust pipes respectively communicating with the two idle cylinders to receive heat (i.e., the heat of reaction of the catalyst) more easily from the exhaust gas purifier while the engine is performing the cylinder-cutoff operation.

In this particular embodiment, the intermediate collecting pipe formed by combining together the two branched exhaust pipes respectively communicating with the two idle cylinders are suitably arranged so as to obliquely cross that portion of the exhaust gas purifier opposite from the engine with respect to an axial direction of the exhaust gas purifier.

This configuration allows the intermediate collecting pipe to receive heat from the exhaust gas purifier in as long a range as possible while the engine is performing the cylinder-cutoff operation.

In another embodiment, the two branched exhaust pipes respectively communicating with the two idle cylinders are arranged to pass through a space over the two branched exhaust pipes respectively communicating with the two active cylinders, and the exhaust gas purifier is located under the two branched exhaust pipes respectively communicating with the two active cylinders.

This configuration allows the temperature of the exhaust gas purifier to be raised by not only the heat of the exhaust gas released from the two active cylinders but also the heat dissipated from the surface of the two branched exhaust pipes respectively communicating with the two active cylinders while the engine is performing the cylinder-cutoff operation.

DETAILED DESCRIPTION

Exemplary embodiments will now be described in detail with reference to the accompanying drawings.

(First Exemplary Embodiment)

Figure 1:
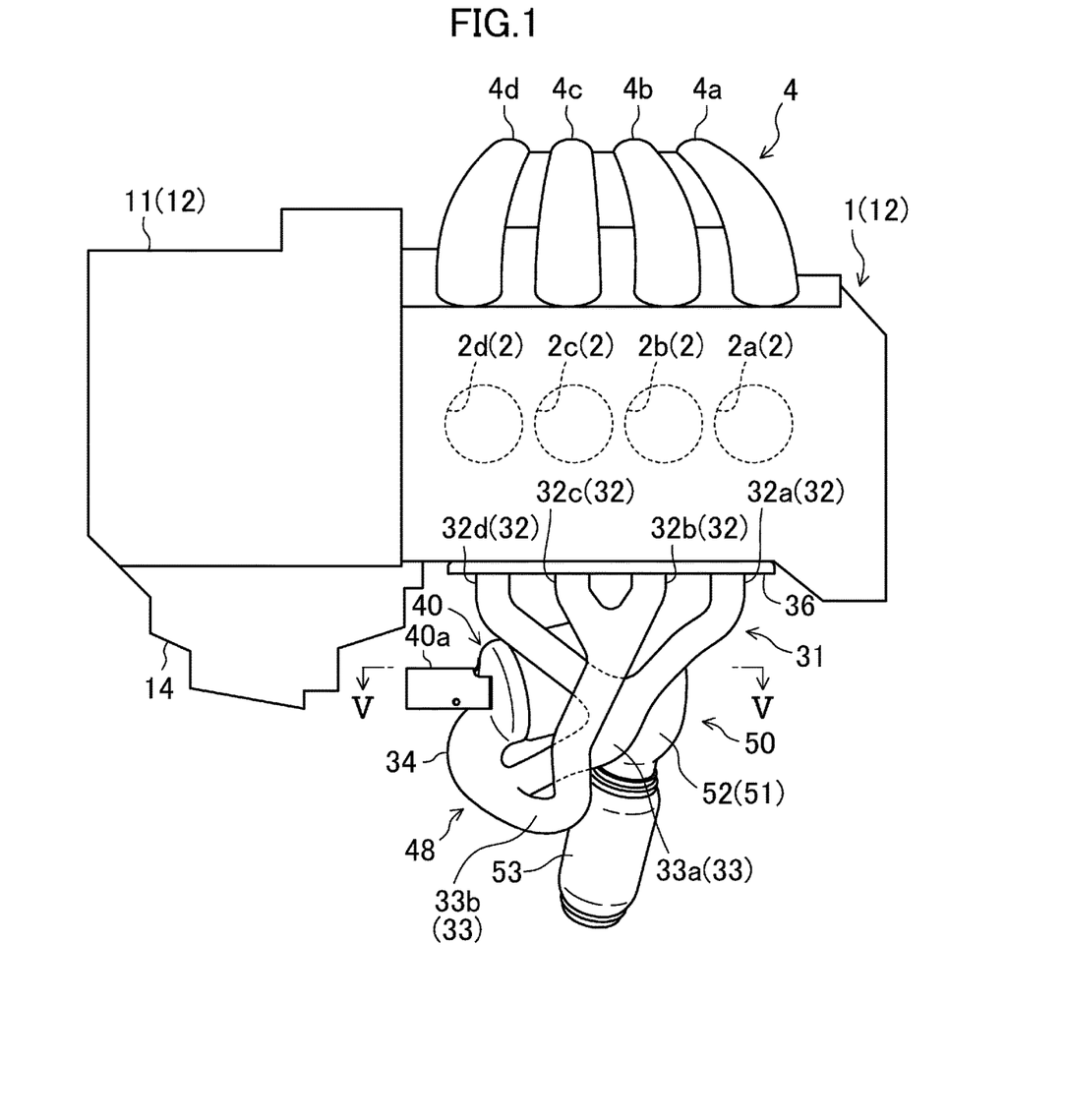
FIG. 1 is a plan view illustrating a multi-cylinder engine exhaust system, to which an exhaust structure according to a first exemplary embodiment is applied, along with a power plant including the engine.
Figure 2:
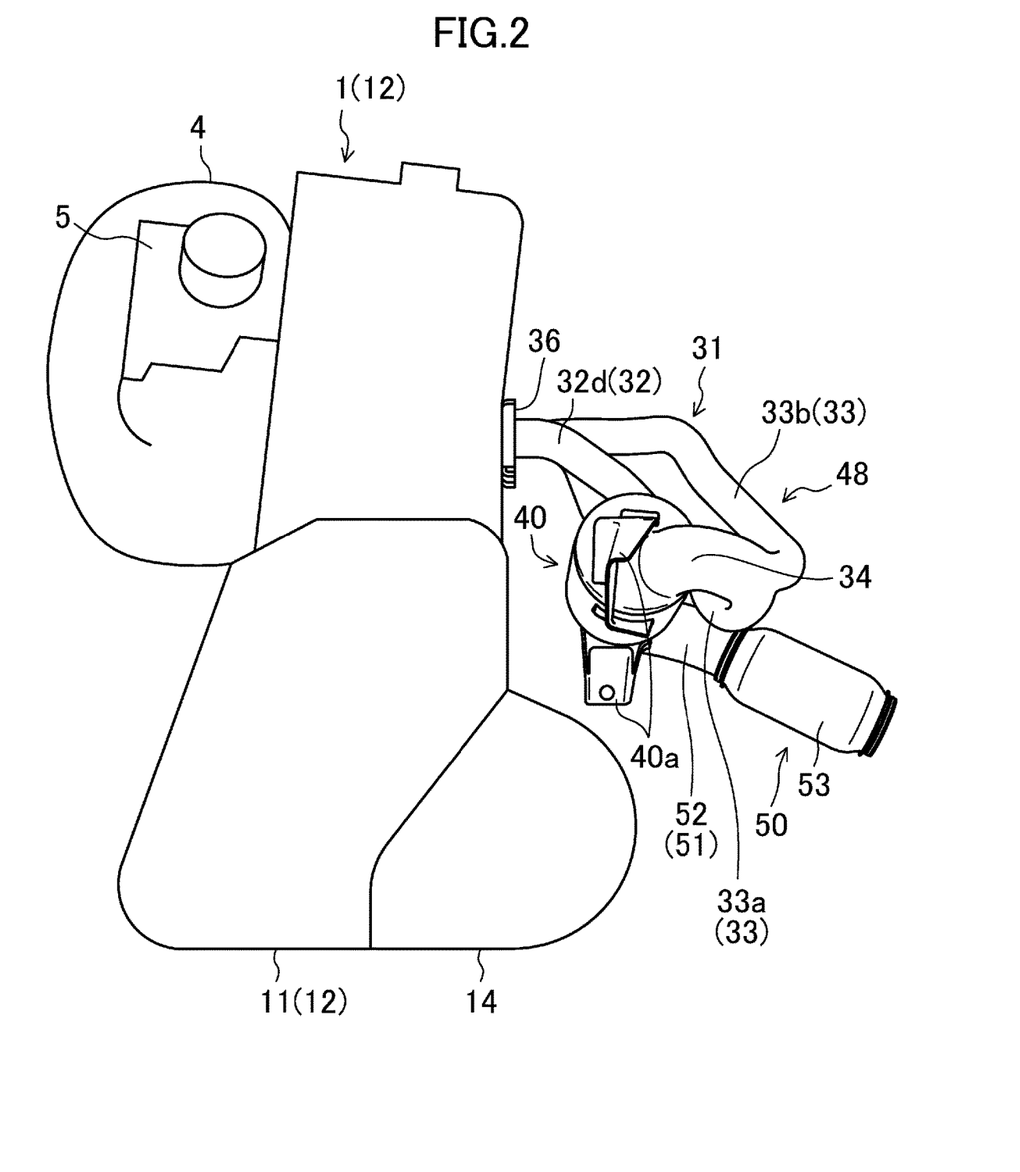
FIG. 2 is a side view illustrating the exhaust system and power plant as viewed from a point on the left-hand side of a vehicle.

FIGS. 1 and 2 illustrate an exhaust system 50 for use in a multi-cylinder engine 1 (hereinafter simply referred to as an "engine 1") to which an exhaust structure according to a first exemplary embodiment is applied. This engine 1 is an in-line four-cylinder engine in which four columnar cylinders 2 are arranged in line. The engine 1 is mounted transversely in an engine compartment at the frontend of a vehicle such that the cylinder arrangement direction is parallel to the vehicle width direction (i.e., the right and left direction on the paper of FIG. 1). That is to say, this engine 1 is a transversely mounted engine. This engine 1 is arranged so as to be upwardly slanted toward the rear end of the vehicle. In the following description, the engine 1 and the exhaust system 50 are supposed to have already been mounted on a vehicle.

At one end in the cylinder arrangement direction (e.g., on the left end of the vehicle (corresponding to the left end in FIG. 1 as well) in this exemplary embodiment), the engine 1 is coupled to a transmission 11. The engine 1 and the transmission 11 together form a power plant 12. This transmission 11 is also mounted transversely such that their input and output shafts (not shown) extend in the vehicle width direction. The input shaft is coupled to the engine's 1 crankshaft extending in the vehicle width direction. The output shaft is coupled to a differential unit 14, which is arranged closer to the rear end of the vehicle than the transmission 11 is, via gears or other members. Although not shown, right and left front wheel drive shafts to be coupled to right and left front wheels, respectively, extend from this differential unit 14 rightward and leftward in the vehicle width direction. In this exemplary embodiment, the vehicle is an FF vehicle, of which the right and left front wheels are driven by the engine 1. In an alternative embodiment, however, the vehicle may be a four-wheel drive vehicle as well.

An intake manifold 4 for introducing intake air into respective cylinders 2 of the engine 1 is further arranged closer to the frontend of the vehicle than the engine 1 is. This intake manifold 4 includes four branched inlet pipes 4a-4d respectively provided for the four cylinders 2 of the engine 1. These branched inlet pipes 4a-4d are arranged in a curvilinear pattern so as to surround a surge tank 5 extending in the cylinder arrangement direction (i.e., the vehicle width direction). The branched inlet pipes 4a-4d provided for the respective cylinders 2 are respectively connected to openings of inlet ports (not shown) of the respective cylinders 2 at a side surface of the engine 1 facing the frontend of the vehicle so as to communicate with the respective cylinders 2.

On the other hand, the exhaust system 50 for discharging the exhaust gas released from the respective cylinders 2 in the engine 1 is arranged closer to the rear end of the vehicle than the engine 1 is. This exhaust system 50 will be described in detail with reference to FIGS. 1 through 6.

The exhaust system 50 is comprised of an exhaust manifold 31, a direct catalyst 40 functioning as an exhaust gas purifier for the engine 1, and a downstream exhaust pipe 51, which are arranged in this order from an upstream point toward the downstream end of the exhaust gas. The exhaust manifold 31 and the direct catalyst 40 correspond to exhaust gas upstream portions 48 of the exhaust system 50 and are housed in the engine compartment.

The exhaust manifold 31 includes: four branched exhaust pipes 32 respectively communicating with the four cylinders 2 of the engine 1; two intermediate collecting pipes 33, each combining together associated two out of the four branched exhaust pipes 32; and a single last collecting pipe 34 formed by combining together these two intermediate collecting pipes 33. The direct catalyst 40 is connected to an exhaust gas downstream end of this last collecting pipe 34.

In the following description, the four cylinders 2 will be hereinafter referred to as first, second, third, and fourth cylinders 2a, 2b, 2c, and 2d, respectively, which are arranged in this order from one end of the vehicle (i.e., the right end of the vehicle opposite from the transmission 11) toward the other end thereof (i.e., the left end of the vehicle with the transmission 11). Note that if there is no need to identify these cylinders 2a-2d, they may be hereinafter collectively referred to as "cylinders 2." Likewise, the four branched exhaust pipes 32 communicating with the first through fourth cylinders 2a-2d, respectively, will be hereinafter referred to as first, second, third, and fourth branched exhaust pipes 32a, 32b, 32c, and 32d, respectively. Note that if there is no need to identify these exhaust pipes 32a-32d, they may be hereinafter collectively referred to as "branched exhaust pipes 32."

A flange 36, extending in the vehicle width direction, is provided in common for all of these first through fourth branched exhaust pipes 32a-32d. The flange 36 is arranged to face the respective exhaust gas upstream ends of the first through fourth branched exhaust pipes 32a-32d and attach these pipes 32a-32d to one side surface of the engine 1 facing the rear end of the vehicle. Mounting this flange 36 onto that side surface of the engine 1 facing the rear end of the vehicle allows the first through fourth branched exhaust pipes 32a-32d to communicate with the first through fourth cylinders 2a-2d, respectively. That is to say, the first through fourth branched exhaust pipes 32a-32d are respectively connected to the exhaust ports (not shown) of their associated cylinders 2, which are cut open through that side surface of the engine 1 facing the rear end of the vehicle, to communicate with their associated cylinders 2.

The flange 36 has a plurality of (e.g., five in this exemplary embodiment) fastening portions 37 to be fastened, with fastening members such as bolts, onto that side surface of the engine 1 facing the rear end of the vehicle. Each of these fastening portions 37 has a fastening member inserting hole into which a fastening member such as a bolt is inserted. In the following description, these five fastening members 37 will be hereinafter referred to as first, second, third, fourth, and fifth fastening portions 37a, 37b, 37c, 37d, and 37e, respectively, which are arranged in this order from the right end of the vehicle toward the left end thereof. Note that if there is no need to identify these fastening portions 37a-37e, they may be hereinafter collectively referred to as "fastening portions 37."

The first fastening portion 37a forms a part of the flange 36 located closer to one outer end in the vehicle width direction (i.e., the right end of the vehicle) than the first cylinder 2a is. The second fastening portion 37b forms another part of the flange 36 located between the first and second cylinders 2a and 2b. The third fastening portion 37c forms still another part of the flange 36 located between the second and third cylinders 2b and 2c. The fourth fastening portion 37d forms yet another part of the flange 36 located between the third and fourth cylinders 2c and 2d. The fifth fastening portion 37e forms yet another part of the flange 36 located closer to the other outer end in the vehicle width direction (i.e., the left end of the vehicle) than the fourth cylinder 2d is. These first through fifth fastening portions 37a-37e are arranged to form two rows of fastening portions extending in the vehicle width direction (i.e., the direction in which the cylinders are arranged in line) and spaced apart from each other in the height direction. Specifically, the upper row of fastening portions, consisting of the second and fourth fastening portions 37b and 37d, is located at a first level near the top end of the flange 36. On the other hand, the lower row of fastening portions, consisting of the first, third, and fifth fastening portions 37a, 37c, and 37e, is located at a second level near the bottom end of the flange 36. Also, these first through fifth fastening portions 37a-37e are arranged in a zigzag pattern such that each of the fastening portions 37 in the upper row is located between an associated pair of adjacent fastening portions 37 in the lower row.

The four cylinders 2 are classified into two groups of cylinders 2, each of the two groups being comprised of two cylinders 2 with mutually discontinuous exhaust strokes (i.e., expansion strokes). Each of the two intermediate collecting pipes 33 is formed by combining together two associated branched exhaust pipes 32 respectively communicating with the two cylinders 2 in an associated one of the two groups. Specifically, in this exemplary embodiment, the exhaust strokes are carried out in the order of the first, third, fourth, and second cylinders 2a, 2c, 2d, and 2b. Thus, the four cylinders 2 are classified into one group consisting of the first and fourth cylinders 2a and 2d and the other group consisting of the second and third cylinders 2b and 2c. Consequently, one intermediate collecting pipe 33 is formed by combining together the first and fourth branched exhaust pipes 32a and 32d communicating with the first and fourth cylinders 2a and 2d, respectively. The other intermediate collecting pipe 33 is formed by combining together the second and third branched exhaust pipes 32b and 32c communicating with the second and third cylinders 2b and 2c, respectively. In the following description, the intermediate collecting pipe 33 formed by combining together the first and fourth branched exhaust pipes 32a and 32d will be hereinafter referred to as a "first intermediate collecting pipe 33a." On the other hand, the intermediate collecting pipe 33 formed by combining together the second and third branched exhaust pipes 32b and 32c will be hereinafter referred to as a "second intermediate collecting pipe 33b." Note that if there is no need to identify these intermediate collecting pipes 33a and 33b, they may be hereinafter collectively referred to as "intermediate collecting pipes 33."

The first through fourth branched exhaust pipes 32a-32d extend generally toward the rear end of the vehicle from the side surface of the engine 1 facing the rear end of the vehicle (or strictly speaking, from the flange 36). Specifically, in a plan view, the first branched exhaust pipe 32a extends toward the rear end of the vehicle from that side surface of the engine 1 facing the rear end of the vehicle and then extends obliquely toward the left end and the rear end of the vehicle. In a plan view, the fourth branched exhaust pipe 32d extends toward the rear end of the vehicle from that side surface and then extends obliquely toward the right end and the rear end of the vehicle. The first and fourth branched exhaust pipes 32a and 32d are combined together at almost the same position in the vehicle width direction as the third fastening portion 37c to form the first intermediate collecting pipe 33a. Meanwhile, in a plan view, the second and third branched exhaust pipes 32b and 32c extend toward the rear end of the vehicle from that side surface of the engine 1 facing the rear end of the vehicle and then are inclined toward the rear end of the vehicle so as to come close to each other in the vehicle width direction and combined together at almost the same position in the vehicle width direction as the third fastening portion 37c to form the second intermediate collecting pipe 33b.

Figure 3:
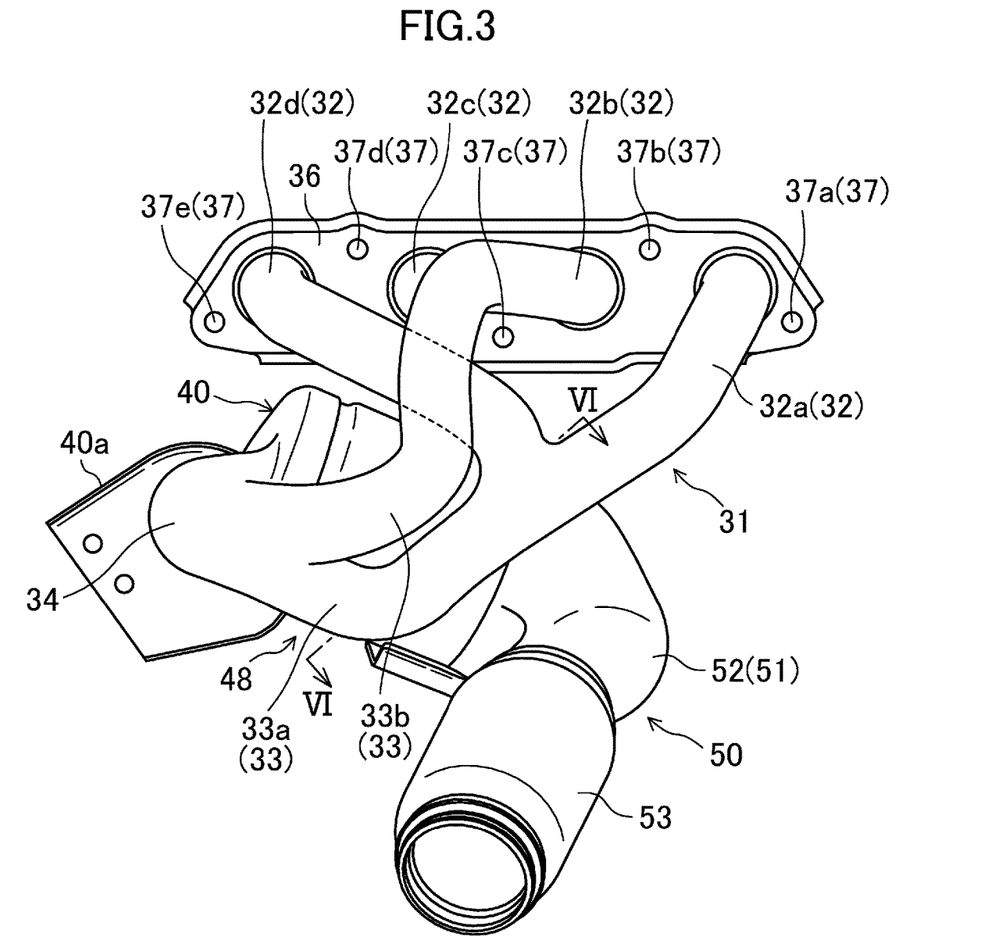
FIG. 3 illustrates parts of an exhaust gas upstream portion and a downstream exhaust pipe of the exhaust system as viewed from a point behind the rear end of the vehicle.
Figure 4:
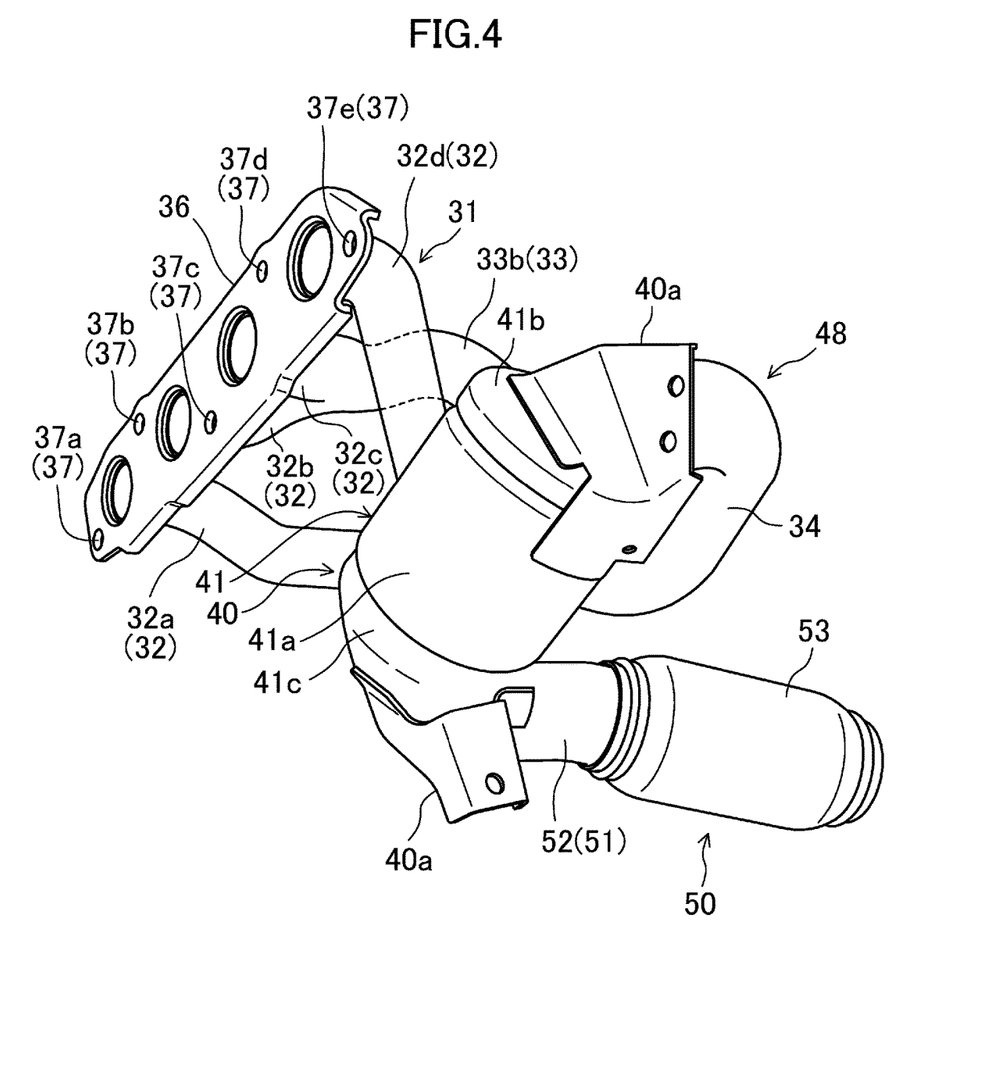
FIG. 4 is a perspective view illustrating parts of the exhaust gas upstream portion and downstream exhaust pipe of the exhaust system as viewed from a point located on the left-hand side of the vehicle and closer to the front end of the vehicle and from below the vehicle.

The second and third branched exhaust pipes 32b and 32c extend substantially horizontally toward the rear end of the vehicle to be combined together. On the other hand, the first and fourth branched exhaust pipes 32a and 32d are arranged to pass through a space under the second and third branched exhaust pipes 32b and 32c. That is to say, the first and fourth branched exhaust pipes 32a and 32d are sloped downward toward the rear end of the vehicle. Among other things, the first branched exhaust pipe 32a has its upstream portion steeply sloped downward. Thus, as shown in FIG. 3 in particular, a space is left vertically between first and second branched exhaust pipes 32a and 32b which is ample enough to allow a fastening tool to easily access the third fastening portion 37c. The fourth branched exhaust pipe 32d passes under the first intermediate collecting pipe 33a, which is located at substantially the same level as the second and third branched exhaust pipes 32b and 32c, to be combined with the first branched exhaust pipe 32a. Thus, the combining portion of the first and fourth branched exhaust pipes 32a and 32d (i.e., an exhaust gas upstream end of the first intermediate collecting pipe 33a) is located at a lower level than the combining portion of the second and third branched exhaust pipes 32b and 32c (i.e., an exhaust gas upstream end of the second intermediate collecting pipe 33b).

The second and third branched exhaust pipes 32b and 32c are shorter in length than the first and fourth branched exhaust pipes 32a and 32d. Thus, the combining portion of the second and third branched exhaust pipes 32b and 32c is located closer to the frontend of the vehicle than that of the first and fourth branched exhaust pipes 32a and 32d is.

In a plan view, the first and second intermediate collecting pipes 33a and 33b extend in respective curvilinear patterns such that their exhaust gas downstream ends go toward one end in the vehicle width direction (e.g., toward the left end of the vehicle, or toward the transmission 11 in the vehicle width direction in this exemplary embodiment) and eventually are combined together, thus forming the last collecting pipe 34. More specifically, the first intermediate collecting pipe 33a extends in a curvilinear pattern from its exhaust gas upstream end toward the left end of the vehicle and then extends linearly toward the left end of the vehicle. On the other hand, the second intermediate collecting pipe 33b is sloped downward from its exhaust gas upstream end toward the rear end of the vehicle while passing over the first intermediate collecting pipe 33a, extends in a curvilinear pattern toward the left end of the vehicle, and then extends linearly toward the left end of the vehicle. Then, the first and second intermediate collecting pipes 33a and 33b are combined together at substantially the same position as the fourth cylinder 2d in the vehicle width direction, thereby forming the last collecting pipe 34.

In a plan view, the last collecting pipe 34 is curved such that its exhaust gas downstream end goes toward the frontend of the vehicle before being connected to the direct catalyst 40. A portion of this last collecting pipe 34 near its exhaust gas downstream end is curved toward the front end and right end of the vehicle. As a result, the last collecting pipe 34 has a curved shape such that its intermediate portion protrudes in the opposite direction from the direct catalyst 40 (i.e., toward the left end of the vehicle), with respect to both ends thereof.

Figure 5:
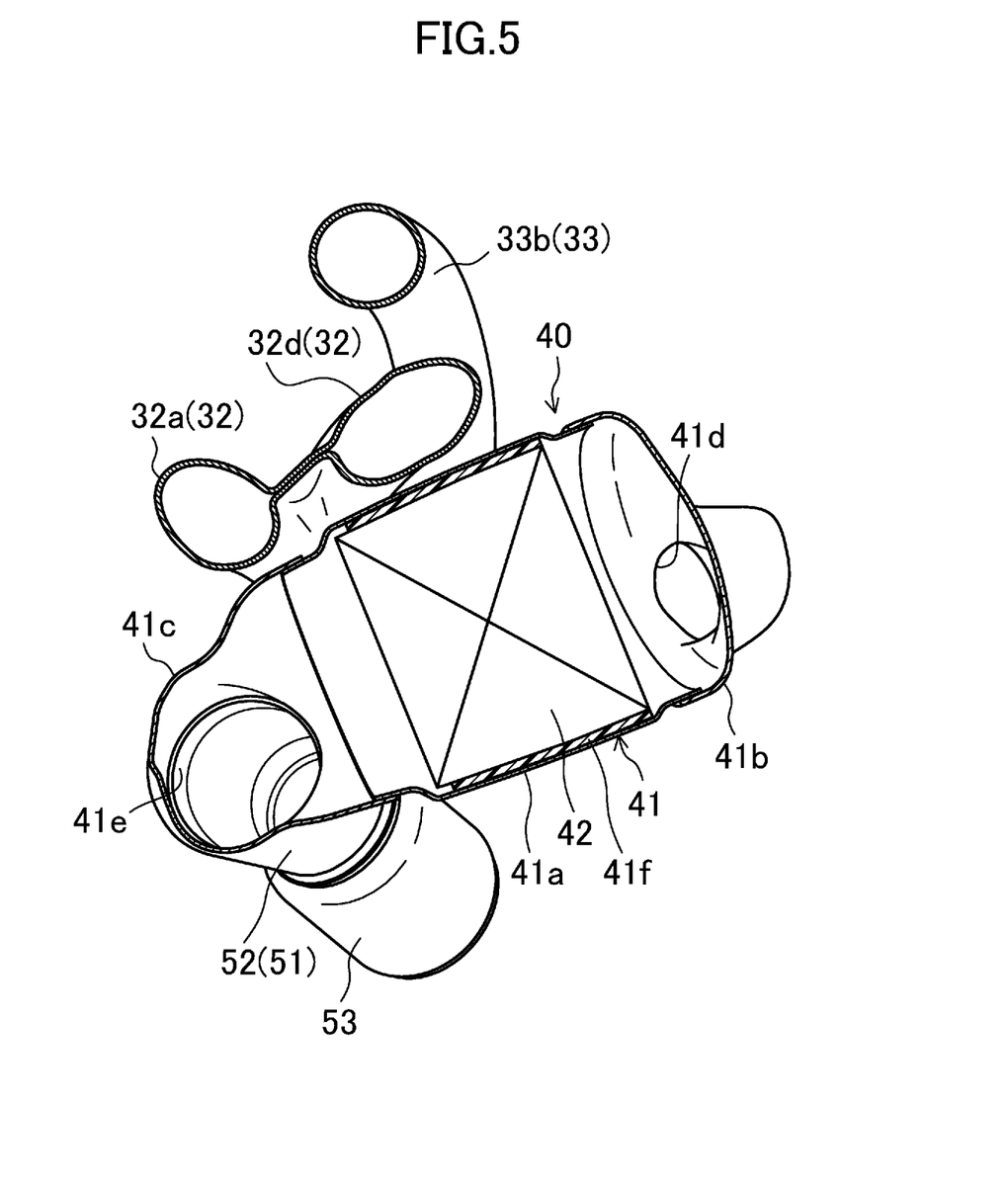
FIG. 5 is a cross-sectional view of the exhaust system taken along the plane V-V shown in FIG. 1.

The direct catalyst 40 includes a generally circular cylindrical case 41 in which a gas channel is defined, and is arranged closer to the rear end of the vehicle than the engine 1 is such that in a plan view, the axial direction of the direct catalyst 40 (i.e., the cylinder axis direction of the case 41) is substantially parallel to the vehicle width direction (i.e., such that the gas channel in the case 41 extends substantially in the vehicle width direction). Thus, the case 41 extends generally along that side surface of the engine 1 facing the rear end of the vehicle. Note that strictly speaking, in this exemplary embodiment, the case 41 (or the gas channel) extends toward the left end of the vehicle while slightly tilting toward the rear end of the vehicle. This arrangement is adopted to allow the exhaust gas entering the case 41 to go as parallel to the cylinder axis of the case 41 as possible. Also, as shown in FIG. 5, the case 41 (gas channel) extends toward the right end of the vehicle (leftward in FIG. 5) so as to be sloped downward. The direct catalyst 40 (the case 41) is secured to a fixing member (not shown) with two brackets 40a.

The direct catalyst 40 contains a catalyst 42 provided in the gas channel in the case 41 as shown in FIG. 5. The case 41 includes a cylindrical (e.g., circular cylindrical in this exemplary embodiment) catalyst container 41a containing the catalyst 42, and an upstream member 41b and a downstream member 41c respectively covering the two openings of the catalyst container 41a at the exhaust gas upstream and downstream ends. The catalyst 42 (e.g., a monolithic carrier) is supported by the case 41 via a mat member 41f attached to an inner peripheral surface of the catalyst container 41a. The catalyst 42 is a three-dimensional catalyst, which is provided to purify HC and CO while the engine 1 is still cold, in particular. Thus, to activate the catalyst 42 as early as possible, the direct catalyst 40 is provided at the exhaust gas upstream portion 48 of this exhaust system 50.

The upstream member 41b of the case 41 has a communication hole 41d (see FIG. 5) to communicate with the exhaust gas flow when connected to the last collecting pipe 34. Likewise, the downstream member 41c has a communication hole 41e (see FIG. 5) to communicate with the exhaust gas flow when connected to the downstream exhaust pipe 51.

Figure 6:
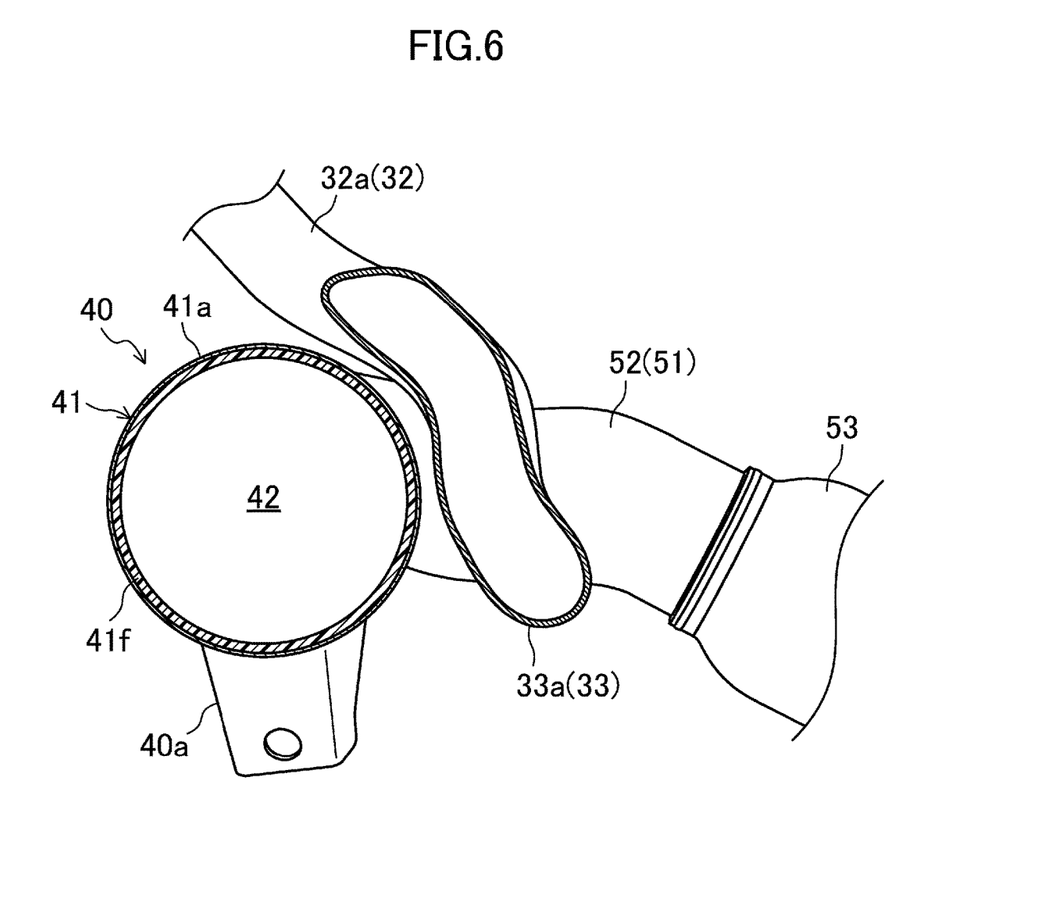
FIG. 6 is a cross-sectional view of the exhaust system taken along the plane VI-VI shown in FIG. 3.

In this exemplary embodiment, as shown in FIGS. 3 and 6, the first and fourth branched exhaust pipes 32a, 32d and the first intermediate collecting pipe 33a are arranged to be proximate to a range of the direct catalyst 40 from an upper portion thereof through another portion thereof closer to the rear end of the vehicle (opposite from the engine 1). Also, as shown in FIG. 3, the first intermediate collecting pipe 33a is arranged to cross a portion of the direct catalyst 40, facing the rear end of the vehicle (i.e., opposite from the engine 1), obliquely with respect to the axial direction of the direct catalyst 40 (extending substantially in the vehicle width direction). In this exemplary embodiment, when viewed from the rear end of the vehicle, the first intermediate collecting pipe 33a extends from up to down so as to be sloped toward an upstream portion of the direct catalyst 40 in the axial direction thereof (i.e., toward the left end of the vehicle). In other words, the first intermediate collecting pipe 33a extends from an upper right point toward a lower left point.

The downstream exhaust pipe 51 is connected to the downstream member 41c (i.e., the communication hole 41e) of the case 41 of the direct catalyst 40. This downstream exhaust pipe 51 is provided to be directed from a portion connected to the direct catalyst 40 (i.e., the exhaust gas upstream end of the downstream exhaust pipe 51) toward a tunnel opening provided at a middle of a bottom portion of a dash panel (not shown) in the vehicle width direction. That is to say, in a plan view, the downstream exhaust pipe 51 extends from its exhaust gas upstream end toward the rear end of the vehicle so as to be sloped toward the left end of the vehicle, further extends from a point before the tunnel opening toward the rear end of the vehicle, and then enters a tunnel of a floor panel.

The downstream exhaust pipe 51 is actually comprised of a plurality of pipes that have been divided along the length thereof. In FIGS. 1-4, however, only the most upstream one 52 of those divided pipes, which is located within the engine compartment, is shown with the illustration of the other divided pipes 52 omitted.

The exhaust gas downstream end of the most upstream divided pipe 52 of the downstream exhaust pipe 51 is connected to a flexible joint 53. This flexible joint 53 is provided to absorb not only the vibration of the engine 1 but also the vibration of the exhaust gas upstream portion 48, involved with the vibration of the engine 1, and prevent these vibrations from being transmitted to any portion of the downstream exhaust pipe 51 located downstream of the flexible joint 53 in the exhaust gas flowing direction. Thus, another divided pipe (not shown) is connected to the exhaust gas downstream end of the flexible joint 53. The number of the flexible joints 53 to provide does not have to be one. Optionally, a plurality of flexible joints 53 may be arranged in series at some intervals along the length of the downstream exhaust pipe 51.

The engine 1 is able to switch its mode of operation from an all-cylinder operation in which all of the four cylinders 2 are activated to a cylinder-cutoff operation in which the two cylinders in one of the two groups of cylinders are deactivated (i.e., only the two cylinders in the other group are activated), or vice versa. In this exemplary embodiment, the first and fourth cylinders 2a and 2d serve as idle cylinders to be deactivated while the engine 1 is performing the cylinder-cutoff operation, and the second and third cylinders 2c and 2d serve as active cylinders to be activated during the cylinder-cutoff operation.

In this exemplary embodiment, not only the injection of a fuel from fuel injection valves and the supply of electricity to an ignition plug to ignite the air-fuel mixture but also the opening and closing operation of inlet and exhaust valves are stopped in the first and fourth cylinders 2a and 2d of the engine 1, thereby performing the cylinder-cutoff operation. The opening and closing of the inlet and exhaust valves may be stopped by a known valve stop mechanism (see, for example, US 2015/053174 A1 and US 2015/053175 A1). Such a valve stop mechanism may be provided either for a supporting member (such as a rush adjuster) arranged at the center of rocking of a rocker arm to support the rocker arm or for the rocker arm itself. The rocker arm may be interposed so as to rock between a rotating cam and a valve.

The valve stop mechanism (see the United States patent applications cited above) provided for the rush adjuster is configured such that an upper part of the rush adjuster is movable relative to a lower part thereof. Regulating its relative movement while the valve stop mechanism is not operating allows the upper part of the rush adjuster to function as a fulcrum of rocking of the rocker arm and makes the rotating cam downwardly press a roller provided for the rocker arm, thus causing the rocker arm to rock, press the valve downward, and open it. On the other hand, while the valve stop mechanism is operating, the upper part of the rush adjuster moves relative to the lower part thereof. Thus, making the rotating cam press the roller downward allows the top of the valve to function as the fulcrum of rocking of the rocker arm, thus causing the rocker arm to press the upper part of the rush adjuster downward with the valve kept closed.

Also, the valve stop mechanism provided for the rocker arm makes the roller movable in the pressing direction relative to the rocker arm. While the valve stop mechanism is not operating, the relative movement is regulated. On the other hand, while the valve stop mechanism is operating, the roller moves relative to the rocker arm. Thus, making the rotating cam press the roller allows the roller to move relative to the rocker arm, thereby keeping the rocker arm from rocking.

Note that while the engine 1 is performing the cylinder-cutoff operation, the opening and closing operation of the inlet and exhaust valves do not always have to be stopped in the idle cylinders. Alternatively, during the cylinder-cutoff operation, only the injection of fuel from the fuel injection valve and the supply of electricity to the ignition plug may be stopped in the idle cylinders.

In this exemplary embodiment, the engine 1 is controlled by a controller (which may be based on a known microcomputer) such that the cylinder-cutoff operation is performed while the engine 1 is running in a predetermined operating range and that the all-cylinder operation is performed while the engine 1 is running in any other operating range. In this exemplary embodiment, the predetermined operating range may be a range in which the load on the engine 1 is equal to or smaller than a predetermined load (i.e., a range corresponding to low- to medium-load regions). Note that while the engine 1 is in an extremely cold mode in which the temperature of cooling water for the engine 1 (hereinafter referred to as an "engine water temperature") detected by an engine water temperature sensor is equal to or lower than a predetermined temperature, the all-cylinder operation is performed even if the engine 1 is running in the predetermined operating range. On the other hand, if the engine water temperature is higher than the predetermined temperature, the cylinder-cutoff operation is always performed as long as the engine 1 is running in the predetermined operating range, no matter whether the engine 1 is cold or hot.

While the engine 1 is performing the cylinder-cutoff operation, failure to conduct the heat of the exhaust gas released from the active cylinders to the direct catalyst 40 efficiently enough would make it difficult to raise the temperature of the direct catalyst 40 to a catalyst activation temperature quickly while the engine 1 is still cold. In addition, in such a situation, the temperature of the direct catalyst 40 that has once reached or exceeded the catalyst activation temperature could drop to less than the catalyst activation temperature if the cylinder-cutoff operation is continued.

In this exemplary embodiment, the second and third branched exhaust pipes 32*b* and 32*c* (i.e., branched exhaust pipes communicating with the two active cylinders (second and third cylinders 2*b*, 2*c*)) are shorter in length than the first and fourth branched exhaust pipes 32*a*, 32*d* (i.e., branched exhaust pipes communicating with the two idle cylinders (first and fourth cylinders 2*a*, 2*d*)). This allows the heat of the exhaust gas released from the active cylinders (i.e., the second and third cylinders 2*b*, 2*c*) to be conducted efficiently to the direct catalyst 40 while the engine 1 is performing the cylinder-cutoff operation. Specifically, in this configuration, each of the branched exhaust pipes communicating with the active cylinders (i.e., the second and third branched exhaust pipes 32*b*, 32*c*) allows only an amount of exhaust gas for a single active cylinder to flow therethrough. Thus, compared to the second intermediate collecting pipe 33*b* allowing an amount of exhaust gas for two active cylinders to flow therethrough, the branched exhaust pipe allows the exhaust gas to flow therethrough at longer time intervals and get cooled more easily, thus causing an increase in the quantity of heat dissipated from the surface of the second and third branched exhaust pipe 32*b*, 32*c*. Thus, shortening the length of the second and third branched exhaust pipes 32*b*, 32*c* minimizes the quantity of heat dissipated from the surface of the second and third branched exhaust pipes 32*b*, 32*c*. This allows the heat of the exhaust gas released from the active cylinders to be conducted efficiently to the direct catalyst 40. Consequently, the temperature of the direct catalyst 40 may be raised to a catalyst activation temperature quickly while the engine 1 is performing the cylinder-cutoff operation and still cold. In addition, even after the temperature of the direct catalyst 40 has reached and exceeded the catalyst activation temperature, the former temperature may be kept equal to or higher than the catalyst activation temperature.

Furthermore, in this exemplary embodiment, the first and fourth cylinders 2*a* and 2*d* serve as the idle cylinders and the second and third cylinders 2*b* and 2*c* serve as the active cylinders. This configuration allows the second and third cylinders 2*b* and 2*c* located at intermediate positions in the cylinder arrangement direction to maintain a higher in-cylinder temperature than the first and fourth cylinders 2*a* and 2*d* located at both ends in the cylinder arrangement direction. Thus, the heat of the higher-temperature exhaust gas released from the active cylinders (i.e., the second and third cylinders 2*b* and 2*c*) may be conducted efficiently to the direct catalyst 40 while the engine 1 is performing the cylinder-cutoff operation. In addition, the second and third branched exhaust pipes 32*b* and 32*c* respectively communicating with the second and third cylinders 2*b* and 2*c* that are adjacent to each other in the cylinder arrangement direction may also be combined together with their length minimized.

Furthermore, in this exemplary embodiment, the branched exhaust pipes communicating with the idle cylinders (i.e., the first and fourth branched exhaust pipes 32*a* and 32*d*) are arranged to pass through a space under the branched exhaust pipes communicating with the active cylinders (i.e., the second and third branched exhaust pipes 32*b* and 32*c*), and the direct catalyst 40 is located under the first and fourth branched exhaust pipes 32*a* and 32*d*. This configuration allows the temperature of the first and fourth branched exhaust pipes 32*a* and 32*d*, communicating with the idle cylinders that tend to cool in the deactivated state while the engine 1 is performing the cylinder-cutoff operation, to be maintained by the heat of reaction of the catalyst 42 in the direct catalyst 40 and the heat dissipated from the second and third branched exhaust pipes 32*b* and 32*c*. Consequently, even after the mode has just been switched from the cylinder-cutoff operation to the all-cylinder operation, the heat of the exhaust gas released from the idle cylinders that have been deactivated and just activated may also be conducted efficiently to the direct catalyst 40.

In particular, in this exemplary embodiment, the first and fourth branched exhaust pipes 32*a* and 32*d* and the first intermediate collecting pipe 33*a* are arranged proximate to a region of the direct catalyst 40 from an upper portion thereof through another portion thereof facing the rear end of the vehicle. This configuration allows the first and fourth branched exhaust pipes 32*a* and 32*d* and the first intermediate collecting pipe 33*a* to receive the heat from the direct catalyst 40 (i.e., the heat of reaction of the catalyst 42) more easily while the engine 1 is performing the cylinder-cutoff operation. Furthermore, the first intermediate collecting pipe 33*a* is arranged so as to obliquely cross that portion of the direct catalyst 40 facing the rear end of the vehicle with respect to an axial direction of the direct catalyst 40. This configuration allows the first intermediate collecting pipe 33*a* to receive heat from the direct catalyst 40 in as long a range as possible while the engine 1 is performing the cylinder-cutoff operation.

(Second Exemplary Embodiment)

Figure 7:
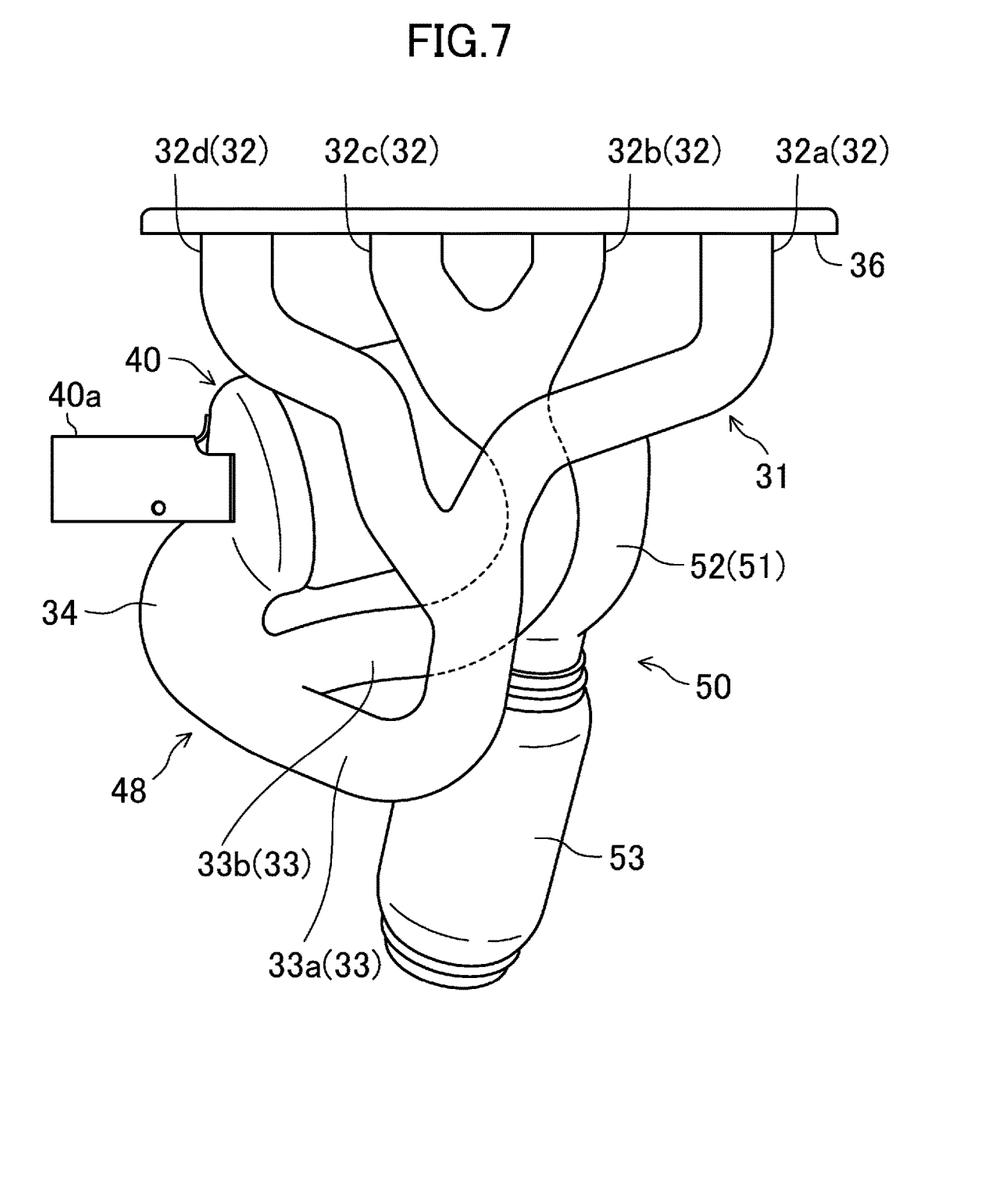
FIG. 7 is a plan view illustrating a second exemplary embodiment of an exhaust system for a multi-cylinder engine.

FIG. 7 illustrates a second exemplary embodiment. In this second exemplary embodiment, the first and fourth branched exhaust pipes 32*a* and 32*d* are arranged at a different vertical level with respect to the second and third branched exhaust pipes 32*b* and 32*c* from the counterparts of the first exemplary embodiment described above.

Specifically, in this exemplary embodiment, the first and fourth branched exhaust pipes 32*a* and 32*d* are arranged to pass through a space over the second and third branched exhaust pipes 32*b* and 32*c*. Also, the combining portion of the first and fourth branched exhaust pipes 32*a* and 32*d* (i.e., an exhaust gas upstream end of the first intermediate collecting pipe 33*a*) is located at a higher vertical level than the combining portion of the second and third branched exhaust pipes 32*b* and 32*c* (i.e., an exhaust gas upstream end of the second intermediate collecting pipe 33*b*).

The first intermediate collecting pipe 33*a* extends in a curvilinear pattern from its exhaust gas upstream end toward the left end of the vehicle and then extends linearly toward the left end of the vehicle. On the other hand, the second intermediate collecting pipe 33*b* extends in a slightly curved pattern from its exhaust gas upstream end toward the right end of the vehicle while passing under the first branched exhaust pipe 32*a*, extends in a curvilinear pattern toward the left end of the vehicle, and then extends linearly toward the left end of the vehicle while passing under the combining portion of the second and third branched exhaust pipes 32b and 32c. The second intermediate collecting pipe 33b is located under the first intermediate collecting pipe 33a. Then, the first and second intermediate collecting pipes 33a and 33b are vertically combined together at substantially the same position as the fourth cylinder 2d in the vehicle width direction, thereby forming the last collecting pipe 34.

In this exemplary embodiment, the second and third branched exhaust pipes 32b and 32c are also shorter in length than the first and fourth branched exhaust pipes 32a and 32d as in the first exemplary embodiment described above. Also, the first and fourth cylinders 2a and 2d serve as the idle cylinders and the second and third cylinders 2b and 2c serve as the active cylinders.

Thus, this exemplary embodiment, as well as the first exemplary embodiment described above, also allows the temperature of the direct catalyst 40 to be raised to the catalyst activation temperature quickly while the engine 1 is performing the cylinder-cutoff operation and is still cold, and then to be kept equal to or higher than the catalyst activation temperature once the temperature of the direct catalyst 40 has reached or exceeded the catalyst activation temperature.

In addition, according to this exemplary embodiment, the branched exhaust pipes communicating with the idle cylinders (i.e., the first and fourth branched exhaust pipes 32a and 32d) are arranged to pass through a space over the branched exhaust pipes communicating with the active cylinders (i.e., the second and third branched exhaust pipes 32b and 32c), and the direct catalyst 40 is located under the second and third branched exhaust pipes 32b and 32c. This configuration allows the temperature of the direct catalyst 40 to be raised by not only the heat of the exhaust gas released from the active cylinders but also the heat dissipated from the surface of the second and third branched exhaust pipes 32b and 32c communicating with the active cylinders while the engine 1 is performing the cylinder-cutoff operation.

The present disclosure is in no way limited to the exemplary embodiments described above, but may be modified, varied or replaced without departing from the spirit of the present disclosure as defined by the appended claims.

For example, in the first and second exemplary embodiments, the first and fourth cylinders 2a and 2d serve as the idle cylinders and the second and third cylinders 2b and 2c serve as the active cylinders. In an alternative embodiment, however, the first and fourth cylinders 2a and 2d may serve as the active cylinders and the second and third cylinders 2b and 2c may serve as the idle cylinders. In that case, the first and fourth branched exhaust pipes 32a and 32d may be shorter in length than the second and third branched exhaust pipes 32b and 32c. Nevertheless, in such an embodiment, the first and fourth branched exhaust pipes 32a and 32d cannot be as short as the second and third branched exhaust pipes 32b and 32c of the exemplary embodiments described above, since the first and fourth cylinders 2a and 2d are located at both ends in the cylinder arrangement direction.

Note that the foregoing description of exemplary embodiments is intended to give only an example of the present disclosure and not to limit the scope of the present disclosure in any way. That is to say, various modifications or variations may be made to those described embodiments without departing from the spirit and scope of the present disclosure that are delineated only by the appended claims.

What is claimed is:

1. An exhaust structure for a multi-cylinder engine, the structure comprising:
four branched exhaust pipes attached to one side of the engine so as to respectively communicate with four cylinders of the engine, the four cylinders being classified into two groups of cylinders, each of the two groups being comprised of two of the four cylinders that have two discontinuous exhaust strokes;
two intermediate collecting pipes, each being formed by combining together associated two of the four branched exhaust pipes respectively communicating with the two cylinders in an associated one of the two groups;
a last collecting pipe formed by combining together these two intermediate collecting pipes; and
an exhaust gas purifier coupled to an exhaust gas downstream end of the last collecting pipe, wherein
the engine is able to switch its mode of operation from an all-cylinder operation in which all of the four cylinders are activated to a cylinder-cutoff operation in which the two cylinders in one of the two groups of cylinders are deactivated to serve as two idle cylinders and the two cylinders in the other group of cylinders are activated to serve as two active cylinders, or vice versa,
two of the four branched exhaust pipes respectively communicating with the two active cylinders are shorter in length than the two other branched exhaust pipes respectively communicating with the two idle cylinders,
the exhaust gas purifier is disposed below the four branched exhaust pipes so as to extend in substantially the same direction as a line of the cylinders of the engine, and
when viewed in a plane, a combining portion where the branched exhaust pipes communicating with the active cylinders are combined together is disposed between the exhaust gas purifier and a side surface of the engine to which the four branched exhaust pipes are attached.

2. The exhaust structure of claim 1, wherein
the engine is an in-line four-cylinder engine, of which the four cylinders are arranged in line, and
if the four cylinders are sequentially called first, second, third, and fourth cylinders, respectively, from one end of the line toward the other end of the line, then the first and fourth cylinders serve as the idle cylinders and the second and third cylinders serve as the active cylinders.

3. The exhaust structure of claim 1, wherein
the two branched exhaust pipes respectively communicating with the two idle cylinders are arranged to pass through a space under the two branched exhaust pipes respectively communicating with the two active cylinders, and
the exhaust gas purifier is located under the two branched exhaust pipes respectively communicating with the two idle cylinders.

4. The exhaust structure of claim 3, wherein
the two branched exhaust pipes respectively communicating with the two idle cylinders and the intermediate collecting pipe formed by combining together the two branched exhaust pipes respectively communicating with the two idle cylinders are arranged to be proximate to a range of the exhaust gas purifier from an upper portion of the purifier through another portion of the purifier opposite from the engine.

5. The exhaust structure of claim 4 wherein
the intermediate collecting pipe formed by combining together the two branched exhaust pipes respectively communicating with the two idle cylinders are arranged so as to obliquely cross that portion of the exhaust gas purifier opposite from the engine with respect to an axial direction of the exhaust gas purifier.

6. The exhaust structure of claim 1, wherein
the two branched exhaust pipes respectively communicating with the two idle cylinders are arranged to pass through a space over the two branched exhaust pipes respectively communicating with the two active cylinders, and
the exhaust gas purifier is located under the two branched exhaust pipes respectively communicating with the two active cylinders.

7. The exhaust structure of claim 3, wherein
a combining portion where the branched exhaust pipes communicating with the idle cylinders are combined together is disposed above the exhaust gas purifier.

* * * * *